(12) United States Patent
Zhou et al.

(10) Patent No.: US 8,046,294 B2
(45) Date of Patent: Oct. 25, 2011

(54) BIDDING IN ONLINE AUCTIONS

(75) Inventors: Yunhong Zhou, Cupertino, CA (US); Deeparnab Chakrabarty, Atlanta, GA (US); Rajan Lukose, Oakland, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 624 days.

(21) Appl. No.: 11/830,698

(22) Filed: Jul. 30, 2007

(65) Prior Publication Data

US 2009/0037317 A1    Feb. 5, 2009

(51) Int. Cl.
*G06Q 40/00* (2006.01)
(52) U.S. Cl. ......... 705/37; 705/35; 705/26.3; 705/14.43
(58) Field of Classification Search .................. 705/1, 7, 705/26, 35, 37
See application file for complete search history.

(56) References Cited

U.S. PATENT DOCUMENTS

| | | | |
|---|---|---|---|
| 7,035,812 B2 * | 4/2006 | Meisel et al. ............ | 705/14 |
| 2002/0156667 A1 * | 10/2002 | Bergstrom ................ | 705/7 |
| 2004/0088241 A1 * | 5/2004 | Rebane et al. ............ | 705/37 |
| 2007/0130004 A1 * | 6/2007 | Borgs et al. ............. | 705/14 |

OTHER PUBLICATIONS

N. Devanuer and V. Vazirani. The spending constraint model for market equilibrium: Algorithmic, existence and uniqueness results. STOC, 2004.*

Yunhong Zhou, Deeparnab Chakrabarty, and Rajan Lukose. Budget Constrained Bidding in Keyword Auctions and Online Knapsack Problems, WINE 2008, LNCS 5385, pp. 566-576, 2008.*

Algorithm for Stochastic Multiple-Choice Knapsack Probem and Application to Keywords and Bidding, WWW 2008, Poster Paper, Apr. 21-25, 2008, Beijing, China.*

* cited by examiner

*Primary Examiner* — Alexander Kalinowski
*Assistant Examiner* — Kellie Campbell

(57) ABSTRACT

The invention is directed to systems, methods, and an apparatus for bidding in online auctions. Bids for advertising include an amount that is a function of an expected value-per-click and a fraction of a budget already spent for advertising slots.

22 Claims, 2 Drawing Sheets

BIDDING IN ONLINE AUCTIONS

BACKGROUND

Online search engines provide a popular tool for searching keywords over the internet. Search engines and corresponding online auctions globally generate billions of dollars a year in revenue. The results page of a keyword search is therefore an effective place for advertisers to reach an engaged audience.

Using an automated auction mechanism, search engines sell the right to place ads next to keyword results and alleviate the auctioneer from the burden of pricing and placing ads. The intent of the consumer is matched with that of the advertiser through an efficient cost/benefit engine that favors advertisers who offer that which consumers seek.

On the advertising side, companies spend billions of dollars each year in marketing with an increasingly large portion of that money dedicated to search engine marketing. Since such large sums of money are being spent, advertisers strive to strategically bid against competing advertisers while maximizing return for advertising dollars.

DETAILED DESCRIPTION

Exemplary embodiments are directed to systems, methods, and apparatus for budget constrained bidding in online keyword auctions. Exemplary embodiments optimize bids for advertisings bidding in a competitive environment for advertising slots in an online auction.

One embodiment is directed to sponsored search auctions hosted by search engines that allow advertisers to select relevant keywords, allocate budgets to those terms, and bid on different advertising positions for each keyword in a real-time auction against other advertisers. Exemplary embodiments provide optimal bid management of advertising budgets, especially for large advertisers who need to manage thousands of keywords and spend tens of millions on such advertising.

In one embodiment, optimization of bid management is cast as an online (multiple choice) knapsack problem and corresponding algorithms for the online knapsack problem achieve a provably optimal competitive ratio. This allows for the optimization of the bidding process, while optimizing bids to best achieve the goals of the program. To maximize revenue from sponsored search advertising, the bidding strategy can be oblivious (i.e., without knowledge) of other bidder's prices and/or click-through-rates for those positions. Further, bidding algorithms in accordance with exemplary embodiments are evaluated using both synthetic data and real bidding data obtained from online websites.

Figure 1:
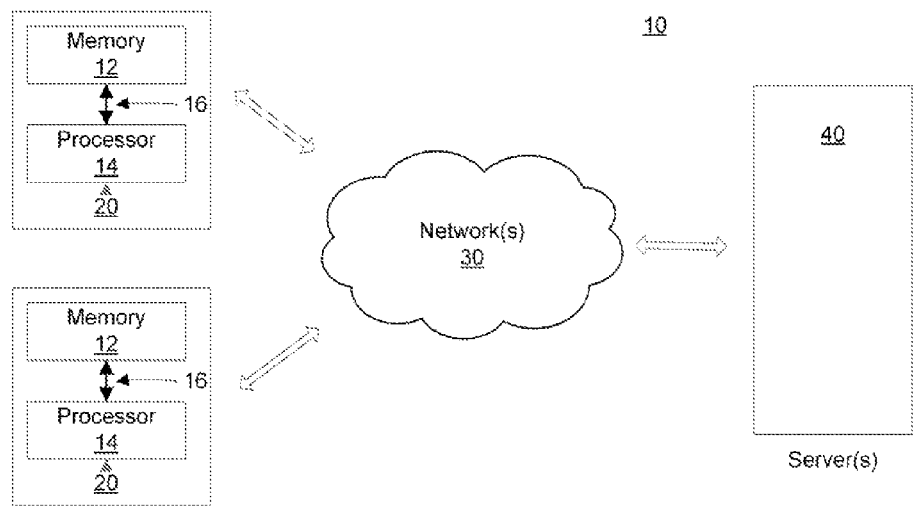
FIG. 1 illustrates an exemplary data processing network in accordance with an exemplary embodiment.

FIG. 1 illustrates an exemplary system or data processing network 10 in which exemplary embodiments are practiced. The data processing network includes a plurality of computing devices 20 in communication with a network 30 that is in communication with one or more computer systems or servers 40.

For convenience of illustration, only a few computing devices 20 are illustrated. The computing devices include a processor 12, memory 14, and bus 16 interconnecting various components. Exemplary embodiments are not limited to any particular type of computing device or server since various portable and non-portable computers and/or electronic devices may be utilized. Exemplary computing devices include, but are not limited to, computers (portable and non-portable), laptops, notebooks, personal digital assistants (PDAs), tablet PCs, handheld and palm top electronic devices, compact disc players, portable digital video disk players, radios, cellular communication devices (such as cellular telephones), televisions, and other electronic devices and systems whether such devices and systems are portable or non-portable.

The network 30 is not limited to any particular type of network or networks. The network 30, for example, can include one or more of a local area network (LAN), a wide area network (WAN), and/or the internet or intranet, to name a few examples. Further, the computer system 40 is not limited to any particular type of computer or computer system. The computer system 40 may include personal computers, mainframe computers, servers, gateway computers, and application servers, to name a few examples.

Those skilled in the art will appreciate that the computing devices 20 and computer system 40 connect to each other and/or the network 30 with various configurations. Examples of these configurations include, but are not limited to, wireline connections or wireless connections utilizing various media such as modems, cable connections, telephone lines, DSL, satellite, LAN cards, and cellular modems, just to name a few examples. Further, the connections can employ various protocols known to those skilled in the art, such as the Transmission Control Protocol/Internet Protocol ("TCP/IP") over a number of alternative connection media, such as cellular phone, radio frequency networks, satellite networks, etc. or UDP (User Datagram Protocol) over IP, Frame Relay, ISDN (Integrated Services Digital Network), PSTN (Public Switched Telephone Network), just to name a few examples. Many other types of digital communication networks are also applicable. Such networks include, but are not limited to, a digital telephony network, a digital television network, or a digital cable network, to name a few examples. Further yet, although FIG. 1 shows one exemplary data processing network, exemplary embodiments can utilize various computer/network architectures.

For convenience of illustration, an exemplary embodiment is illustrated in conjunction with a search engine. This illustration, however, is not meant to limit embodiments with search engines. Further, exemplary embodiments do not require a specific search engine. The search engine can be any kind of search engine now known or later developed. For example, exemplary embodiments are used in conjunction with existing search engines (such as PageRank and variations thereof) or search engines developed in the future.

Figure 2:
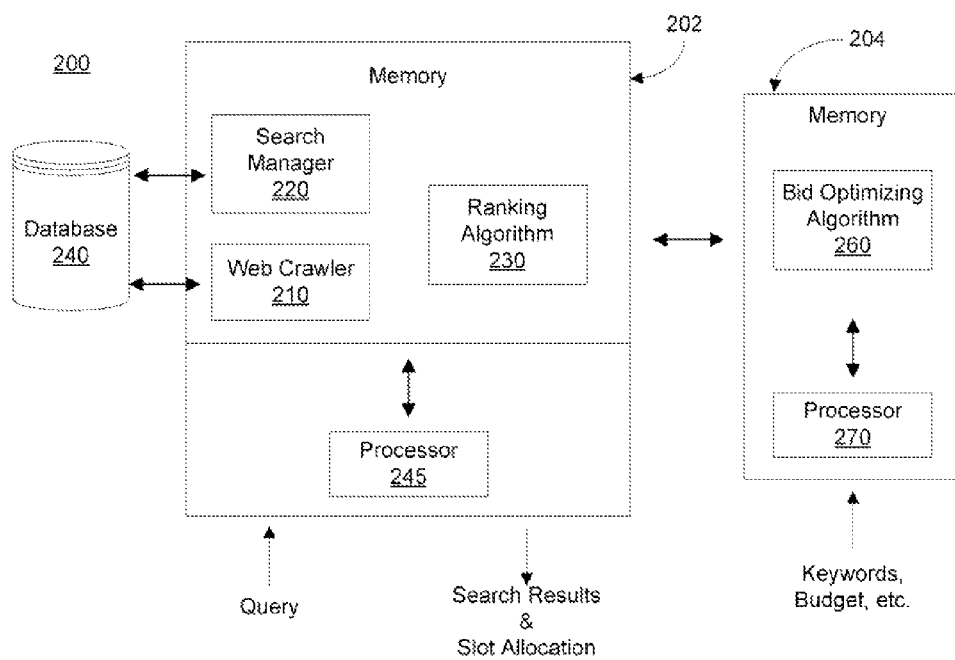
FIG. 2 illustrates an exemplary search engine and bid optimization engine in accordance with an exemplary embodiment.

FIG. 2 illustrates an exemplary system 200 that includes a search engine 202 and bid optimization engine 204. As one example, the search engine 202 and bid optimization engine 204 are programs stored in the memory of computer system 40. The search engine enables a user to request information or media content having specific criteria. The request, for example, can be entered as keywords or a query. Upon receiving the query, the search engine 202 retrieves documents, files, or information relevant to the query. The bid optimization engine 204 optimizes bids for advertising slots when the search results are displayed to a user.

Figure 3:
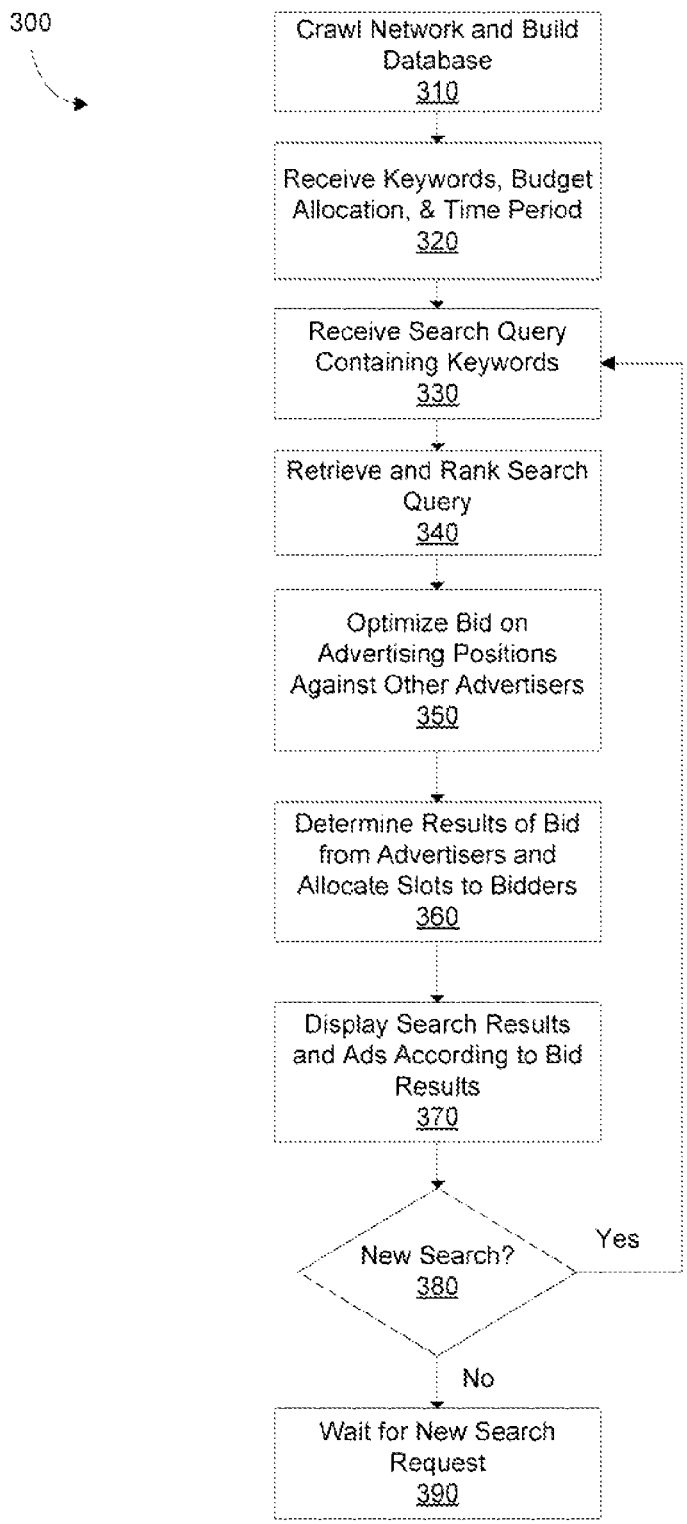
FIG. 3 illustrates an exemplary flow diagram in accordance with an exemplary embodiment.

For simplicity of illustration, the search engine 202 includes a web crawler 210, a search manager 220, and a ranking algorithm 230 coupled to one or more processors 245 and a database 240. The bid optimization engine 204 includes a bid optimizing algorithm 260 coupled to one or more processors 270. The search engine 202 and bid optimization engine 204 are discussed in connection with the flow diagram 300 of FIG. 3.

According to block 310, the web crawler 210 crawls or searches the network and builds an associated database 240. The web crawler 210 is a program that browses or crawls networks, such as the internet, in a methodical and automated manner in order to collect or retrieve data for storage. For example, the web crawler can keep a copy of all visited web pages and indexes and retain information from the pages. This information is stored in the database 240. Typically, the web crawler traverses from link to link (i.e., visits uniform resource locators, URLs) to gather information and identify hyperlinks in web pages for successive crawling.

One skilled in the art will appreciate that numerous techniques can be used to crawl a network, and exemplary embodiments are not limited to any particular web crawler or any particular technique. As one example, when web pages are encountered, the code comprising each web page (e.g., HyperText Markup Language or HTML code) is parsed to record its links and other page information (example, words, title, description, etc.). A listing is constructed containing an identifier (example, web page identifier) for all links of a web page. Each link is associated with a particular identifier. The listing is sorted using techniques known in the art to distinguish the web pages and respective links. The relationship of links to the parsed web pages and the order of the links within a web site are maintained. After sufficient web sites have been crawled, the recorded or retrieved information is stored in the database 240.

Once the database 240 is created, the search engine 202 can process search queries and provide search results. One skilled in the art will appreciate that numerous techniques can be used to process search queries and provide search results, and exemplary embodiments can be utilized with various techniques.

According to block 320, the bid optimization engine 204 receives information from an advertiser concerning the placement of ads for online auctions. By way of example, this information includes, but is not limited to, one or more of keywords, a budget, and a time period for utilizing the budget.

By way of example, suppose there are N+1 bidders $\{0, \ldots, N\}$ interested in a single keyword. Bidder 0 is the default advertiser, and he wants to maximize his profit over a period of time T. Let V denote the expected value-per-click for the default advertiser, and he has a budget of B over time period T (e.g. if T is 24 hours, B is the daily budget). Here the budget constraints is a hard constraint, in the sense that once exhausted, it cannot be refilled; budget remaining at the end of the period T is taken away. Once a bidder exhausts his budget, he leaves the auction.

According to block 330, the search manager 220 receives a query (such as keywords) from a user or computing device (such as computing device 20 in FIG. 1). The search manager 220 can perform a multitude of different functions depending on the architecture of the search engine. By way of example and not to limit exemplary embodiments, the search manager 220 tracks user sessions, stores state and session information, receives and responds to search queries, and coordinates the web crawler and ranking algorithm, to name a few examples.

According to block 340, the search engine retrieves and ranks the search query. By way of example, the search engine 202 accesses the database 240 to find or retrieve information that correlates to the query. As an example, the search manager 220 could retrieve from the database 240 all web sites that have a title and description matching keywords in the query. The search manager 220 then initiates the ranking algorithm 230 to score and rank the information (for example, the retrieved web sites) retrieved from the database 240.

According to block 350, the bid optimization, engine 204 optimizes bids on advertising positions against other advertisers. Generally, for each keyword and each time period, exemplary embodiments determine how much money an advertiser should bid to obtain a slot or advertising position on the search results page in order to maximize return on investment (ROI).

In one embodiment, for each user click on its ad, the advertiser obtains revenue that is the expected valise-per-click and a profit that is equal to the difference between revenue and cost. The advertiser (or the agent on behalf of the advertiser) has a budget constraint and would like to maximize either the revenue or the profit. These budget constraints arise out of the ordinary operational constraints of the firm and its interactions with its partners, as well as being a generic feature of keyword auction services themselves.

One embodiment uses competitive analysis to evaluate bidding strategies and compares results with the maximum profit attainable by the omniscient bidder who knows the bids of all the other users ahead of time. This competitive analysis framework has been used in the worst-case analysis of online algorithms and helps to convert the problem of devising bidding strategies to designing algorithms for online knapsack problems. The most general online knapsack problem admits no online algorithms with any non-trivial competitive ratio, the auction scenario suggests a few constraining assumptions that enable exemplary embodiments to provide optimal online algorithms.

The bidding strategies suggested by the online algorithms and in particular the bidding strategy for revenue maximization can be stated as follows:

At any time t, if the fraction of budget spent is z(t), bid $V/\psi(z(t))$.

Here V is the expected value-per-click of the keyword, and $\psi(z)$ is a continuous function of z specified later. Thus the bidding price depends only on the value of the keyword and the fraction of budget spent. The strategy is oblivious in the sense that it does not need to consider other players' bids or how frequently queries arrive.

According to block 360, a determination is made of the results of the bid from advertisers and slots are allocated to the bidders. By way of example, the bidding strategies in accordance with exemplary embodiments are based on the current policy used by search engines to display their ads. For instance, embodiments assume that at each query of a keyword, the highest bidder gets first position, the second highest gets the second position and so on. Moreover, the pricing scheme is the generalized second price scheme where the advertiser in the i-th position pays the bid of the (i+1)-th advertiser whenever the former's ad is clicked on.

In one embodiment, bidders bid on the keyword, and are allowed to change their bids at any moment of time. One assumption is that the bids are very small compared to the budget of Bidder 0. As soon as a query for the keywords arrives, the search engine allocates S slots to bidders as follows: It takes the S highest bids, $b_1 \geq b_2 \geq \ldots \geq b_S$ and displays s-th bidder's ad in slot s. Moreover, if any user clicks on the ad at the s-th slot, the search engine charges the s-th bidder a price $b_{s+1}$, if s<S or a minimum fee $b_{min}$ (for example, 10¢). Hence, it can be assumed that all the bids are at least $b_{min}$.

Each slot s has a click-through rate $\alpha(s)$, which is defined as the expected number of clicks on an ad divided by the total number of impressions (displays). Usually $\alpha(s)$ is a decreasing function of s. Each time his ad in slot s is clicked. Bidder 0 gets a profit of $V-b_{s+1}$ where $b_{s+1}$ is the bid of the advertiser in the (s+1)-th slot or $b_{min}$ if s=S. Suppose the time interval T is discretized into periods $\{1,2,\ldots,T\}$, such that, within a single time period t, no bidder changes his bid. Let X(t) denote the expected number of queries for the keyword in time period t. Moreover, suppose Bidder 0 can make his bid in time period t after seeing all other bidders' bids. This assumption does not matter much and is mainly for explanation purposes. The problem faced by Bidder 0 is to decide, how much to bid at each time period t in order to maximize its profit while keeping its total cost within its budget.

According to block 370, the ranked information is then displayed to the user or provided to the computing device. Further, the ads are displayed with the search results according to the bid results. The information is displayed, for example, in a hierarchical format with the most relevant information (for example, webpage with the highest score) presented first and the least relevant information (for example, webpage with the lowest score) presented last. The ads are displayed according to the winning bids (i.e., the ad with the highest bid being displayed first, the ad with the next highest bid being displayed second, etc.).

If a modified or new search is requested, according to block 380, then the flow diagram loops back to block 330; otherwise, the flow diagram waits for new search requests 390.

Exemplary embodiments are further described below with headings provided for various sections.

Bidding Strategies and Knapsack Problems

If bids of all the agents are known at each time period, then the best bidding strategy corresponds to solving an offline knapsack problem. To illustrate this concept, discussion begins with a single-slot case where there is only one ad slot. At each time period t, let b(t) be the maximum bid on the keyword among bidders 1 to N. The omniscient bidder knows all the bids $\{b(t)\}^T_{t=1}$. To maximize his profit, the omniscient bidder should bid higher that b(t) at those time periods which give him maximum profit and keep his total cost within budget. Winning at time t costs him $w(t)=b(t)X(t)\alpha$ and earns him profit $\pi(t)=(V-b(t))X(t)\alpha$, where $X(t)\alpha$ is the number of clicks at time period t. Thus, the omniscient bidder should choose time periods $S \subset T$ to maximize $\pi(S)=\Sigma_{t\in S}\pi(t)$ satisfying the constraint $w(S)=\Sigma_{t\in S}w(t)\leq B$. This is a standard instance of the classic 0/1 knapsack problem, which is defined as following: Given a knapsack of capacity B and T items of profit and weight $(\pi(t), w(t))$ for $1\leq t\leq T$, select a subset of items to maximize the total profit with total weight of selected items bounded by B. For the case of maximizing revenue, it is similar except that $\pi(t)=VX(t)\alpha$ for each item t. However, for the keyword auction problem, items arrive in an online fashion. At each period t, Bidder 0 has to make a decision of either overbidding b(t) or not. Bidder 0 does not know the future, and furthermore, it could neither recall time instances gone nor revoke its decision of outbidding later. Thus designing a bidding strategy corresponds to designing an algorithm for the online knapsack problem.

The case of multiple slots is captured by the online version of a variant of the classical knapsack problem, the multiple-choice knapsack problem. This topic is more fully discussed below in the section entitled Multiple-Slot Auctions and Online MCKP.

The knapsack problem is a classical problem in operations research and theoretical computer science. For this discussion, two reasonable assumptions are made on the items of the knapsack, which allow development of interesting online algorithms. The assumptions are stated below and justified in the section entitled Single-Slot Auctions and Online Knapsack Problems.

The assumptions are:
1. Each item has weight much smaller than the capacity of the knapsack, that is, $w(t)<<B$ for each item t.
2. The value-to-weight ratio of each item is both lower and upper bounded, i.e., $L\leq\pi(t)/w(t)\leq U$, $\forall t$.

Results

In the case of single-slot auctions, the bidding strategy corresponds to online algorithms for the classical 0/1 knapsack problem. One embodiment is an algorithm for the online knapsack problem with competitive ratio $\ln(U/L)+1$, and also a matching lower bound of $\ln(U/L)+1$. Therefore an exemplary embodiment algorithm is provably optimal in the worst case sense. The online knapsack algorithm is translated into a bidding strategy for the single-slot auction. These strategies are oblivious, and thus work even if other bidders' bids were not known. It also implies that the strategy is an approximate dominant strategy in the sense that it is an approximate best response to any bid profile of other bidders.

As discussed below, results are extended to the case of multiple-slot auctions. One embodiment gives a $(\ln(U/L)+2)$-competitive online algorithm for a variant of the classical knapsack problem called the multiple-choice knapsack problem (MCKP). The algorithm is translated for Online-MCKP to bidding strategies for the multiple-slot case in order to obtain both profit-maximizing and revenue-maximizing bidding strategies. The profit maximizing strategy is not oblivious and requires knowledge of other players' bids and also the click-through-rates of all slots. The revenue-maximizing strategy remains oblivious.

The reason why the multiple-slot profit-maximizing strategy turns non-oblivious is subtle: It might be more profitable for an advertiser to appear in a less desirable (lower) slot and pay less than appearing in a higher slot which gives more clicks.

For ease of explanation, discussion is restricted to a single keyword. Exemplary embodiments, though, extend to the general case of multiple keywords and multiple slots per keyword, with V replaced by $V_{max}$, the maximum valuation-per-click among all the keywords.

One embodiment implements these bidding strategies and evaluates them using both synthetic bidding data and real bidding data obtained from an online website. One embodiment modifies the strategy by adding a sniping heuristic, which while maintaining the same theoretical bounds, performs much better empirically. One embodiment also utilizes parameter tuning for the performance of bidding algorithms.

Single-Slot Auctions and Online Knapsack Problems

In this section, an embodiment focuses on single-slot auctions and the corresponding online knapsack problem. One embodiment utilizes algorithms for the online knapsack problem and translates them back into bidding strategies for single-slot keyword auctions. Before presenting the algorithms, an explanation of the previous assumptions is provided.

Recall that the unique item at time period t has a weight w(t) and a profit $\pi(t)$ where:

$$w(t)=b(t)X(t)\alpha, \pi(t)=(V-b(t))X(t)\alpha.$$

For revenue maximization, $\pi(t)$ corresponds to the revenue of winning the bid, thus $\pi(t)=VX(t)\alpha$. Here $X(t)\alpha$ is the number of expected clicks on the displayed ad in time period t. The first assumption of $w(t)<<B$ follows since the budget of the agent is usually much larger than the money spent in small time periods as the bids are small. For the second assumption, separation is made into two cases. In the case of profit maximization, since $\pi(t)/w(t)=V/b(t)-1$, it suffices to set $U=V/b_{min}-1$. To get a lower bound on the profit-to-weight ratio, it is noted that if $b(t)$ is close to V, then not too much is lost by not bidding at those time intervals. Specifically, if a bid is made of only when $b(t) \leq V/(1+\epsilon)$ for some fixed $\epsilon>0$, the maximum amount of profit lost from not bidding in these time periods is bounded by $\epsilon B$. If $\epsilon$ is small, then the profit loss can be negligible. In other words, one embodiment sets $L=\epsilon$ and ignores all items with efficiency smaller than $\epsilon$. This results in a maximum profit loss of $\epsilon B$, and it will not affect much the algorithm performance if the total profit of the algorithm is relatively large. In the case of revenue maximization, then $\pi(t)/w(t)=V/b(t)$. Here it suffices to set $U\equiv V/b_{min}$. For the lower bound with revenue maximization, it is reasonable to assume that the optimum strategy would not bid when $b(t)$ is higher than V. This holds when there are enough items with value-to-cost ratio at least 1 to consume the entire budget. Otherwise, the optimal solution needs to take items which cost more than their value, and the budget seems unnecessarily large. Therefore, assuming that the optimum never bids when $b(t)$ is higher than V, we only need to consider items with efficiency at least 1, i.e., set $L=1$.

The Online Knapsack Problem

Given an online algorithm A, we say that A is c-competitive (has a competitive ratio of c) if for any input sequence of items $\sigma$, we have $OPT(\sigma) \leq c\, A(\sigma)$, where $A(\sigma)$ is the profit of A given $\sigma$, and $OPT(\sigma)$ is the maximum profit obtained by any offline algorithm with the knowledge of $\sigma$.

For all items t, $w(t)<<B$ and $L \leq \pi(t)/w(t) \leq U$. Given the lower bound L and upper bound U for item efficiency, it is verifiable that the algorithm which keeps selecting items until the knapsack is full gives a competitive ratio of U/L. Next the algorithm for the online knapsack problem is presented, which achieves an optimal competitive ratio bound $\ln(U/L)+1$. In the remainder of the discussion, e denotes the base of the natural logarithm, Algorithm: Online KP Threshold Let $\Psi(z)\equiv(Ue/L)^z(L/e)$. At time t, let $z(t)$ be the fraction of capacity filled, pick element t iff:

$$\pi(t)/w(t) \geq \Psi(z(t)).$$

Observe that for $z \in [0, \bar{z}]$, where $\bar{z}=1/\ln(Ue/L)$, $\Psi(z) \leq L$, thus the algorithm will pick all items available until $\bar{z}$ fraction of the knapsack is filled, When $z=1$, $\Psi(z)=U$, and since $\Psi$ is strictly increasing, the algorithm will not spend more than its budget.

The above algorithm uses just one threshold function to select items, and the threshold function is a specialized exponential function of its capacity filled.

As a theorem, for any input sequence $\sigma$, if $A(\sigma)$ is the profit obtained by ONLINE-KP-THRESHOLD and $OPT(\sigma)$ is the maximum profit that can be attained, then:

$$OPT(\pi) \leq A(\sigma)(\ln(U/L)+1).$$

In other words, the above algorithm has a competitive ratio of $\ln(U/L)+1$.

Bidding Strategies for Single-Slot Auctions

We now construct the bidding strategies suggested by the algorithm ONLINE-KP-THRESHOLD. Consider the profit-maximizing case first. An assumption is made that $b(t) \leq V/(1+\epsilon)$ for some $\epsilon$. Set $U=V/b_{min}-1$ and $L=\epsilon$. At time t, suppose Bidder 0 spent $z(t)$ fraction of its budget. This corresponds to the fact that $z(t)$ fraction of the knapsack is filled. As per the algorithm, Bidder 0 must win the bid if and only if the efficiency of the next bid is at least $\Psi(z(t))$. That is, Bidder 0 must bid higher than $b(t)$ iff $(V-b(t))/b(t) \geq \Psi(z(t))$ or equivalently, $b(t) \leq V/(1+\Psi(z(t)))$, which means bidding $V/(1+\Psi(z(t)))$ suffices. The bidding strategy is stated below:

Bidding Strategy: PROFIT-MAXIMIZING SINGLE-SLOT

Fix $\epsilon>0$. Let $\Psi(z)\equiv(Ue/\epsilon)^z(\epsilon/e)$.

At time t, if fraction of budget spent is $z(t)$, then bid $$b_0(t)=V/(1+\Psi(z(t))).$$

The above bidding strategy for profit-maximization single-slot auctions has the following performance guarantee: For any fixed $\epsilon>0$, let Profit denote the profit obtained by the profit-maximizing bidding strategy, then $$OPT \leq \epsilon B + \ln(e(V-b_{min})/(\epsilon\, b_{min})) \cdot \text{Profit}$$

where $b_{min}$ is the minimum bid required of the system and OPT is the maximum profit obtained by the omniscient bidder.

Similarly, using $U=V/b_{min}$ and $L=1$, the following revenue-maximizing bidding strategy is obtained:

Bidding Strategy: REVENUE-MAXIMIZING SINGLE-SLOT

At time t, if fraction of budget spent is $z(t)$, then bid $$b_0(t)=V/\Psi(z(t)).$$

Here, let Revenue be the revenue obtained by the revenue-maximizing bidding strategy and OPT be the maximum revenue obtained by the omniscient bidder. Assuming that OPT does not contain any item t with $b(t)>V$, then $$OPT \leq \ln(eV/b_{min}) \cdot \text{Revenue}$$

where $b_{min}$ is the minimum bid requirement of the auction system.

Multiple-Slot Auctions and Online MCKP

Exemplary embodiments extend to the case of multiple slots. The strategy in the multiple-slot case corresponds to the online multiple-choice knapsack problem. The multiple-choice knapsack problem (MCKP) is the generalization of the knapsack problem: Given a knapsack of capacity B, and T sets of items $N_1, N_2, \ldots N_T$, the goal is to choose at most one item from each set to maximize value and not exceed the knapsack capacity. In the online version, the sets come online and we need to make our decision on the fly. Items once picked cannot be disposed, and sets cannot be recalled.

Next it is shown how to model the multiple-slot keyword auction problem into Online MCKP. Once again, the budget corresponds to the capacity of the knapsack. At each time period t, let $b_1(t) \geq b_2(t) \geq \ldots \geq b_S(t)$ be the S highest bids. To win slot s, bidder 0 needs to bid $b_s(t)$. This incurs a cost $w_s(t)$ and a profit $\pi_S(t)$ where $$w_s(t) \equiv b_s(t)X(t)\alpha(s),\ \pi_S(t) \equiv (V-b_s(t))X(t)\alpha(s),$$

and $\alpha(s)$ is the click-through-rate of slot s. The S slots at each time period correspond to the set arriving at time t. Since Bidder 0 can win at most one slot at each time period, the omniscient bidder needs to solve the multiple-choice knapsack problem while Bidder 0 needs to solve the online multiple-choice knapsack problem. Once again, assume that (1) $w_s(t)<<B$ and (2) $L \leq \pi_s(t)/w_s(t) \leq U$ for all s, t.

Algorithm for Online MCKP

The algorithm for online-MCKP is similar to that for Online-KP, which is stated below:

Algorithm ONLINE-MCKP-THRESHOLD

Let $\Psi(z)\equiv(Ue/L)^z(L/e)$,

At time t, let $z(t)$ denote the fraction of capacity filled, $$E_t = \left\{ s \in N_1 \,\Big|\, \frac{\pi_s(t)}{w_s(t)} \geq \Psi(z(t)) \right\}$$

pick element $s \in E_1$ with maximum $\pi_s(t)$.

This algorithm has a competitive ratio of $\ln(U/L)+2$.

Bidding Strategies for Multiple-Slot Auctions

For multiple-slot auctions, consideration is given to the profit-maximizing case first. As in the single-slot case, we only consider slots with $b_s(t) \leq V/(1+\epsilon)$ for all s,t. This implies that the efficiency of each bid is upper bounded by $U=V/b_{min}-1$ and lower bounded by $\epsilon$. So the following bidding strategy is obtained:

Bidding Strategy PROFIT-MAXIMIZING MULTIPLE-SLOT

Fix $\epsilon > 0$. Let $\Psi(z) \equiv (Ue/\epsilon)^z(\epsilon/e)$.

At time t, let z(t) be fraction of budget spent, $$E_t = \{s | b_s(t) \leq V/(1+\Psi(z(t)))\},$$

bid $b_s(t)$ where $s = \arg\max_{s \in E_t}(V-b_s(t))\alpha(s)$.

Note that the bidding strategy is still oblivious of X(t), however it now requires knowing the bids $b_s(t)$ and also $\alpha(s)$. The above bidding strategy has a performance guarantee, stated as the following theorem: Let Profit denote the profit obtained by our profit-maximizing bidding strategy. Then for any $\epsilon > 0$, $$OPT \leq \epsilon B + (ln(V/\epsilon\, b_{min})+2)\text{Profit}$$

where $b_{min}$ is the minimum bid required of the system and OPT is the maximum profit obtained by the omniscient bidder.

For revenue maximization, the bidding strategy is similar to profit maximization except that it can actually find the slot s in time t to maximize the revenue. This is because, the revenue obtained on bidding $b_s(t)$ is $VX(t)\alpha(s)$. Given that $\alpha(s)$ is a decreasing function, maximizing $VX(t)\alpha(s)$ is equivalent to minimizing s, i.e., to find the rank s as low as possible. Since the efficiency condition imposes that the winning slot has $b_s(t) \leq V/\Psi(z(t))$, the bid should be equal to this. Thus a bidding strategy exists for revenue-maximizing multiple-slot auctions which are the same as that for single-slot auctions, which has the desirable property of obliviousness.

Strategy Modification

Embodiments can be modified to have improved empirical performance. As a negative, the strategy (which is described in the following) does not remain oblivious any more: it requires knowledge of X(t), the traffic function and also $\alpha$, the click through-rate of the slot.

A weakness can occur if the strategy is unaware of the time remaining in the auction. It stops overbidding too early, missing out possible advantageous bids later on. Thus a potential performance improvement is snipping towards the end of the auction. At time t, suppose the fraction of budget remaining is $y(t)=1-z(t)$. Moreover assume future click traffic $X(\tau)\alpha$ for $\tau > t$ is known. With this assumption, a modified bid strategy is:

Bidding Strategy: PROFIT-MAXIMIZING SINGLE-SLOT WITH SNIPING

Fix $\epsilon \geq 0$. Let $\Psi(z) \equiv (Ue/tCS)^z(tCS/e)$.

At time t, if fraction of budget spent is z(t), bid $$\max\left\{\frac{V}{1+\Psi(z(t))}, \min\left\{V, \frac{(1-z(t))B}{\int_t^T X(\tau)\alpha d\tau}\right\}\right\}.$$

In one embodiment, this strategy performs better than the original strategy, although it requires the knowledge of X(t) and $\alpha$.

The above sniping heuristic can be generalized to the multiple-slot case and it is formally described below:

Bidding Strategy: Multiple-Slot with Sniping.

At time t, let z(t) denote fraction of budget spent $\rho = \Psi z(t)$. For each slot s, $$\text{if } b_s(t) \leq \frac{(1-z(t))B}{\alpha(s)\int_t^T X(\tau)d\tau},$$

$$\rho = \min\left\{\rho, \frac{\pi_s(t)}{w_s(t)}\right\}$$

$$E_t = \left\{s \mid \frac{\pi_s(t)}{w_s(t)} \geq \rho\right\}$$

bid $b_s(t)$ where $s \in E$, with max $\pi_s(t)$.

Exemplary embodiments are thus directed to budget constrained bidding strategies in keyword auctions. Embodiments include a single keyword case and strategies for both single-slot and multiple-slot cases. In the case of single-slot auctions, one embodiment provides oblivious strategies for both profit and revenue maximizations. The obliviousness is a desirable property in any bidding strategy. In the multiple-slot case, one embodiment has a strategy for profit maximization wherein it is no longer oblivious and requires knowledge of the various bids and click-through-rates of slots. However, for revenue maximization, it still remains oblivious.

Exemplary embodiments can be extended to the general case where there are multiple keywords and each keyword has multiple positions. The competitive ratio would now have V replaced by $V_{max}$, where $V_{max}$ is the maximum valuation for all keywords.

In one exemplary embodiment, one or more blocks in the flow diagrams are automated. In other words, apparatus, systems, and methods occur automatically. As used herein, the terms "automated" or "automatically" (and like variations thereof) mean controlled operation of an apparatus, system, and/or process using computers and/or mechanical/electrical devices without the necessity of human intervention, observation, effort and/or decision.

The flow diagrams in accordance with exemplary embodiments are provided as examples and should not be construed to limit other embodiments within the scope of embodiments. For instance, the blocks should not be construed as steps that must proceed in a particular order. Additional blocks/steps may be added, some blocks/steps removed, or the order of the blocks/steps altered and still be within the scope of the invention. Further, blocks within different figures can be added to or exchanged with other blocks in other figures. Further yet, specific numerical data values (such as specific quantities, numbers, categories, etc.) or other specific information should be interpreted as illustrative for discussing exemplary embodiments. Such specific information is not provided to limit the exemplary embodiments.

Various exemplary embodiments are implemented as one or more computer software programs. The software is implemented as one or more modules (also referred to as code subroutines, or "objects" in object-oriented programming). The location of the software (whether on the client computer or elsewhere) will differ for the various alternative embodiments. The software programming code, for example, can be accessed by the processor of the computing device 20 and computer system 40 from long-term storage media of some type, such as a CD-ROM drive or hard drive. The software programming code can be embodied or stored on any of a variety of known media for use with a data processing system or in any memory device such as semiconductor, magnetic and optical devices, including a disk, hard drive, CD-ROM, ROM, etc. The code can be distributed on such media or can be distributed to users from the memory or storage of one computer system over a network of some type to other computer systems for use by users of such other systems. Alternatively, the programming code can be embodied in the memory and accessed by the processor using the bus. The techniques and methods for embodying software programming code in memory, on physical media, and/or distributing software code via networks are well known and will not be further discussed herein.

The above discussion is meant to be illustrative of the principles and various exemplary embodiments. Numerous variations and modifications will become apparent to those skilled in the art once the above disclosure is fully appreciated. It is intended that the following claims be interpreted to embrace all such variations and modifications.

What is claimed is:

1. A method executed by a computer, comprising:
   receiving, at a computer, bids for advertising at an online search auction;
   calculating, by the computer, an amount to bid for the advertising, the amount equal to an expected value-per-click divided by a value of a function of a fraction of a budget already spent for advertising on previous bids at the online search auction; and
   displaying, at a computer, advertisements in winning ad slots.

2. The method of claim 1 further comprising, placing a bid only when a highest bid among current bidders for the advertising is less than the expected value-per- click.

3. The method of claim 1, wherein an efficiency of each ad slot has an upper bound based on the expected value-per-click divided by a search engine minimum fee charge for receiving a slot to advertise.

4. The method of claim 1 further comprising, calculating an optimal amount of money to bid for the advertising based on a multiple-choice knapsack problem modeling of ad slots over time periods.

5. The method of claim 1 further comprising, modeling of a multiple-choice knapsack problem based on one of maximizing a total revenue of an advertiser over time, maximizing a total profit of the advertiser, or a total number of impressions.

6. The method of claim 1 further comprising:
   modeling an online trading process of goods or services, wherein a trader has a budget constraint as an online knapsack problem;
   solving a online trading problem using an algorithm developed for the online knapsack problem.

7. The method of claim 1 further comprising:
   determining an optimal amount of money to bid for the advertising slot without having knowledge of other bids and click-through rates for advertising slots.

8. The method of claim 1 further comprising:
   receiving keywords for a search query;
   assessing the keywords to determine how much to bid for an advertising slot in order to maximize a return on investment for the search query.

9. A non-transitory computer-readable medium having computer-readable program code embodied therein which when executed by a computer causes the computer to perform the following steps:
   receiving bids for advertising slots for a network search query;
   bidding for one of the advertising slots an amount of money that is an expected value-per-click divided by an exponential function of a fraction of a budget already spent for previous advertising slots;
   displaying advertisements of bidders.

10. The non-transitory computer-readable medium of claim 9, wherein the code further causes the computer to perform:
    calculating when a maximum bid amount for the advertising slots is greater than the expected value-per-click.

11. The non-transitory computer-readable medium of claim 9, wherein the code further causes the computer to perform:
    determining the amount of money to bid based on profit for winning the one of the advertising slots divided by a cost to win the one of the advertising slots.

12. The non-transitory computer-readable medium of claim 9, wherein the amount of money depends only on a value of keywords submitted for the network search query and the fraction of the budget already spent.

13. The non-transitory computer-readable medium of claim 9, wherein the code further causes the computer to perform:
    determining an optimal amount to bid for the one of the advertising slots without utilizing information pertaining to (1) amounts of other bids received for the one of the advertising slots and (2) how frequently network search queries occur.

14. The non-transitory computer-readable medium of claim 9, wherein each of the advertising slots has a click-through rate that is defined as an expected number of clicks on an advertisement divided by a total number of impressions.

15. A computer system, comprising:
    memory storing an algorithm;
    processor to execute the algorithm to:
    examine bids for advertising slots for a keyword search;
    submit a bid amount for the advertising slots, the bid amount being a function of an expected value-per-click divided by a value of an exponential function of a fraction of a budget already spent;
    allocate the advertising slots to bidders.

16. The computer system of claim 15, wherein the bid amount depends only on a value of keywords for the keyword search and the fraction of the budget already spent.

17. The computer system of claim 15 wherein the processor further executes the algorithm to:
    place a bid only when a highest bid among current bidders for the advertising slots are less than the expected value-per-click.

18. The computer system of claim 15 wherein the processor further executes the algorithm to:
    calculate an optimal amount of money to bid for one of the advertising slots without utilizing information of other bids and click-through rates for the advertising slots.

19. The computer system of claim 15 wherein the processor further executes the algorithm to:
    calculate an amount to bid for one of the advertising slots in order to maximize a return on money budgeted for advertising at online auctions.

20. The computer system of claim 15 wherein the processor further executes the algorithm to:
    calculate an amount of money to bid based on profit for winning one of the advertising slots divided by a cost to win the one of the advertising slots.

21. The computer system of claim 15 wherein the processor further executes the algorithm to:
    calculate an optimal amount to bid for the advertising slots without utilizing information pertaining to a frequency of how often search queries are executed.

22. The computer system of claim 15, wherein each of the advertising slots has a click-through rate defined as an expected number of clicks on an ad divided by a total number of displays.

* * * * *

UNITED STATES PATENT AND TRADEMARK OFFICE
CERTIFICATE OF CORRECTION

| | | |
|---|---|---|
| PATENT NO. | : 8,046,294 B2 | Page 1 of 1 |
| APPLICATION NO. | : 11/830698 | |
| DATED | : October 25, 2011 | |
| INVENTOR(S) | : Yunhong Zhou et al. | |

It is certified that error appears in the above-identified patent and that said Letters Patent is hereby corrected as shown below:

In column 11, line 25, in Claim 2, delete "value-per- click." and insert -- value-per-click. --, therefor.

Signed and Sealed this
Tenth Day of July, 2012

David J. Kappos
*Director of the United States Patent and Trademark Office*